(12) United States Patent
Smyros et al.

(10) Patent No.: US 9,495,357 B1
(45) Date of Patent: Nov. 15, 2016

(54) TEXT EXTRACTION

(71) Applicants: Athena Ann Smyros, Gunter, TX (US); Constantine John Smyros, Gunter, TX (US)

(72) Inventors: Athena Ann Smyros, Gunter, TX (US); Constantine John Smyros, Gunter, TX (US)

(*) Notice: Subject to any disclaimer, the term of this patent is extended or adjusted under 35 U.S.C. 154(b) by 0 days.

(21) Appl. No.: 14/268,865

(22) Filed: May 2, 2014

Related U.S. Application Data

(60) Provisional application No. 61/818,908, filed on May 2, 2013.

(51) Int. Cl.
*G06F 17/27* (2006.01)

(52) U.S. Cl.
CPC ......... *G06F 17/2765* (2013.01); *G06F 17/271* (2013.01); *G06F 17/274* (2013.01); *G06F 17/277* (2013.01)

(58) Field of Classification Search
CPC .. G06F 17/27; G06F 17/2705; G06F 17/271; G06F 17/274; G06F 17/2755; G06F 17/277; G06F 17/2775
USPC .............................................................. 704/9
See application file for complete search history.

(56) References Cited

U.S. PATENT DOCUMENTS

| | | | | |
|---|---|---|---|---|
| 5,161,245 A * | 11/1992 | Fenwick | .............. | G06F 17/273 382/177 |
| 5,317,507 A * | 5/1994 | Gallant | ......................... | 715/260 |
| 5,495,413 A * | 2/1996 | Kutsumi et al. | .................. | 704/4 |
| 5,528,491 A * | 6/1996 | Kuno et al. | ........................ | 704/9 |
| 5,598,557 A * | 1/1997 | Doner et al. | | |
| 5,761,631 A * | 6/1998 | Nasukawa | ........................ | 704/9 |
| 5,924,105 A * | 7/1999 | Punch et al. | .................. | 715/234 |
| 5,930,746 A * | 7/1999 | Ting | .................................. | 704/9 |
| 5,995,922 A * | 11/1999 | Penteroudakis et al. | ......... | 704/9 |
| 6,112,168 A * | 8/2000 | Corston et al. | .................... | 704/9 |
| 6,119,077 A * | 9/2000 | Shinozaki | ........................ | 704/3 |
| 6,167,368 A * | 12/2000 | Wacholder | ........................ | 704/9 |
| 6,311,182 B1 * | 10/2001 | Colbath et al. | ............... | 704/246 |
| 6,317,707 B1 * | 11/2001 | Bangalore et al. | ............... | 704/9 |
| 6,327,589 B1 * | 12/2001 | Blewett et al. | | |
| 6,473,730 B1 * | 10/2002 | McKeown et al. | ............... | 704/9 |
| 6,553,347 B1 * | 4/2003 | Tavor et al. | ............... | 705/14.25 |
| 6,675,159 B1 * | 1/2004 | Lin et al. | | |
| 6,684,183 B1 * | 1/2004 | Korall | .................... | G06F 17/271 704/257 |
| 6,731,802 B1 * | 5/2004 | Kacmarcik et al. | .......... | 382/185 |
| 7,072,794 B2 * | 7/2006 | Wittkowski | .................. | 702/179 |
| 7,389,233 B1 * | 6/2008 | Gish et al. | .................... | 704/270 |
| 8,180,713 B1 * | 5/2012 | Rigby et al. | .................... | 706/12 |
| 8,423,350 B1 * | 4/2013 | Chandra et al. | .................. | 704/9 |
| 8,719,244 B1 * | 5/2014 | Pasca | .......................... | 707/706 |
| 8,856,006 B1 * | 10/2014 | Patel et al. | .................... | 704/257 |
| 2002/0046019 A1 * | 4/2002 | Verhagen | ............. | G06F 17/2785 704/9 |
| 2002/0052901 A1 * | 5/2002 | Guo et al. | ...................... | 707/531 |
| 2002/0111792 A1 * | 8/2002 | Cherny | ............................. | 704/8 |
| 2002/0143524 A1 * | 10/2002 | O'Neil et al. | ..................... | 704/9 |
| 2003/0007889 A1 * | 1/2003 | Chien et al. | ..................... | 422/54 |
| 2003/0023423 A1 * | 1/2003 | Yamada et al. | .................. | 704/2 |
| 2003/0074184 A1 * | 4/2003 | Hayosh | ................. | G06F 17/271 704/1 |
| 2003/0167266 A1 * | 9/2003 | Saldanha et al. | ................. | 707/6 |
| 2003/0200077 A1 * | 10/2003 | Leacock et al. | ................... | 704/1 |
| 2003/0216904 A1 * | 11/2003 | Knoll et al. | ...................... | 704/9 |

(Continued)

*Primary Examiner* — Eric Yen
(74) *Attorney, Agent, or Firm* — Slater Matsil, LLP

(57) ABSTRACT

Embodiments are used to extract terms from any text set that are used on other text, such as in a repository, that then can be used in a variety of applications, from providing search results, to analyzing data sets, to building a variety of text generation tools, such as messaging and emails.

3 Claims, 2 Drawing Sheets

(56) References Cited

U.S. PATENT DOCUMENTS

| | | | |
|---|---|---|---|
| 2003/0236659 A1* | 12/2003 | Castellanos | 704/4 |
| 2004/0148170 A1* | 7/2004 | Acero et al. | 704/257 |
| 2005/0049852 A1* | 3/2005 | Chao | 704/9 |
| 2005/0065776 A1* | 3/2005 | Coden et al. | 704/10 |
| 2005/0171783 A1* | 8/2005 | Suominen | 704/276 |
| 2005/0220351 A1* | 10/2005 | Vanderwende et al. | 382/229 |
| 2005/0256700 A1* | 11/2005 | Moldovan et al. | 704/9 |
| 2006/0089928 A1* | 4/2006 | Johnson | 707/4 |
| 2006/0117307 A1* | 6/2006 | Averbuch | G06F 17/2247 717/143 |
| 2006/0224570 A1* | 10/2006 | Quiroga et al. | 707/3 |
| 2007/0078814 A1* | 4/2007 | Flowers et al. | 707/2 |
| 2007/0078832 A1* | 4/2007 | Ott | G06F 17/30867 |
| 2007/0100618 A1* | 5/2007 | Lee et al. | 704/238 |
| 2007/0265829 A1* | 11/2007 | Turner et al. | 704/9 |
| 2008/0109475 A1* | 5/2008 | Burmester | G06F 17/2785 |
| 2008/0154828 A1* | 6/2008 | Antebi et al. | 706/46 |
| 2008/0313180 A1* | 12/2008 | Zeng et al. | 707/6 |
| 2009/0037458 A1* | 2/2009 | Meyer | G06F 17/30327 |
| 2009/0058860 A1* | 3/2009 | Fong et al. | 345/467 |
| 2009/0094185 A1* | 4/2009 | Shultz | G06F 17/30286 |
| 2010/0241963 A1* | 9/2010 | Kulis et al. | 715/727 |
| 2010/0332502 A1* | 12/2010 | Carmel | G06F 17/30864 707/759 |
| 2011/0246183 A1* | 10/2011 | Nagatomo | 704/9 |
| 2013/0021346 A1* | 1/2013 | Terman | 345/467 |
| 2013/0262091 A1* | 10/2013 | Zhang | 704/9 |
| 2014/0143268 A1 | 5/2014 | Pasca | |

\* cited by examiner

TEXT EXTRACTION

RELATED APPLICATIONS

This application claims priority from Provisional Application No. 61/818,908, "DOCUMENT RECONSTRUCTION, TEXT EXTRACTION, AND AUTOMATED SEARCH", filed 2 May 2013, the disclosure of which is hereby incorporated herein by reference.

BACKGROUND

Currently, a myriad of communication devices are being rapidly introduced that need to interact with natural language in an unstructured manner. Communication systems are finding it difficult to keep pace with the introduction of devices as well as the growth of information.

BRIEF DESCRIPTION OF THE DRAWINGS

The accompanying drawings are incorporated in and are a part of this specification. Understanding that these drawings illustrate only typical embodiments of the invention and are not therefore to be considered to be limiting of its scope, the invention will be described and explained more fully through the use of these accompanying drawings in which.

DETAILED DESCRIPTION OF THE INVENTION

The embodiments described herein are used to extract terms from any text set that are used on other text, such as in a repository, that then can be used in a variety of applications, from providing search results, to analyzing data sets, to building a variety of text generation tools, such as messaging and emails. This process is also called text extraction, where the terms of a document, including single words and multiple words that are linked via grammar, such as "good quality widget" and "food stylist for south magazine". In some cases, a set of terms that form a unit of understanding, such as a group of modifiers with an object, are an improvement over other types of extractions based on statistics or prior knowledge about the subject. Using a grammatical filter, these problems can be eliminated or reduced and all (or most) such multi-word terms can be located and added to a search. In addition, combinatorial analysis can be done so that comparisons against different multi-word terms, such as "Siberian husky" and "Siberian husky sled dog team", can be related in a variety of ways by recognizing that "Siberian husky" is a subset of "Siberian husky sled dog team".

Figure 1:
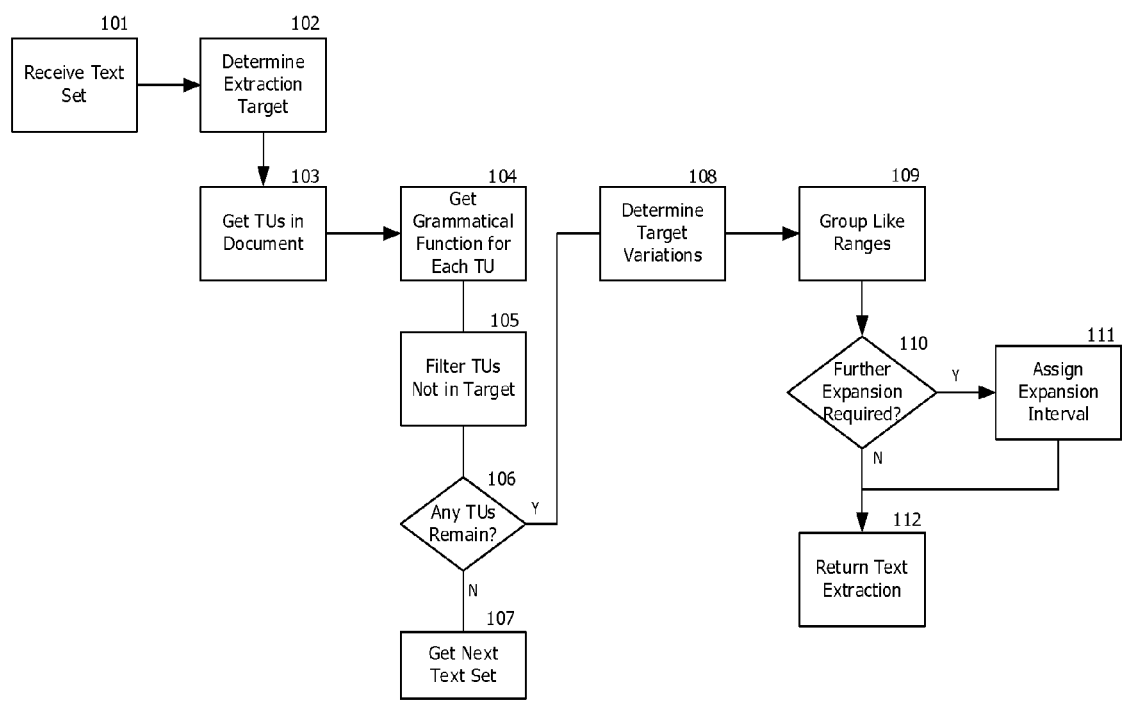
FIG. 1 illustrates an example of a flowchart that is usable with the embodiments described herein.

FIG. 1 shows a flowchart that is suitable for use with the embodiments herein. It starts by the system receiving a text set 101 that may represent a message, a document, an email, a file, or may represent a set of such text. Note that the original input may comprise non-text, which has been converted to text for use with the embodiments. There may be multiple files that are represented by the input text set. The delivery of the text set may be a human or requesting function or it may also be triggered when a system- or repository-level has been notified of a new email or a updated document. The delivery of the input may be using any communication means, such as over a wireline network, wireless network, or may be the result of a change in memory for an embedded device, etc. This process, depending on the need for user interaction, may be completely automated or may require that an input is used, such as a requirements document. This serves as the control point for building the search terms that are used to compare against another set of documents, files, or messages. Any number of text sets can be automated using this process.

The extraction target method 102 is then determined as serves as the input for the processing of the target, and may be sent using any messaging or call-based system. For most implementations, the determination of an extraction target refers to a grammatical function, such as objects or verbs. A grammatical function is calculated using any number of processing; the type of output will generally determine the required grammatical function. Such processing may optionally include semantical functions as well. For instance, a grammatical function is equal to an object; this means that all objects are the extraction target for that document. This is normally used for information analysis tasks, where any object is generally being used, such as for comparing a focus document against a repository, as in a requirements list. The grammatical function for objects should be completed so that the satisfactory output of the system can be achieved; which is to locate those objects in the repository that compare favorably to the focus document, meeting the requirements of such a document.

Another example of this requires that a text input that contains objects is found first, then the term "timeline" can be found within the range of objects. In a sample document, the objects are already known and do not have to be calculated for this process, so that the object "timeline" can then be found by looking at the document object set. The document object set is equal to "project management", project timeline", and "Gantt chart". In this case, the modifiers of all nouns are part of the object set; this may vary depending on implementation requirements. Then, the term timeline is found and is equal to "project timeline". This illustrates the restriction of the object set to those terms related to "timeline". Another form of semantical processing is the use of similarity measures, such as synonyms, stemming, and other such approximations, whereby the use of the term "timeline" would also include like terms such as "timelines".

In some cases, a variable may be assigned that is equal to the extraction target. The variable may be derived from the task the system is performing, or may be the result of the processing of the input by another system. For instance, a company is looking for all the customer responses to its best-selling product. The best-selling product varies over time, so it is not the same product each time the system is run. Therefore, the input to the system may be equal to the variable best-selling product, which may be in one use of the system equal to "short-handled squeegee" and in another use of the system at a different time may equal "long-handled squeegee". Any number of such variables may be used by this system as well as any length of individual terms, such as a single-word object or a multiple-word object.

The variations of this are based on the follow-on application, such as an automated search, a content feeder based on the focus, or sentiment analysis. In addition, the extraction target may be set by the user directly, meaning that any grammatical functions used as part of the extraction process would have to match the grammatical function of the user-based target input. The target may be comprised of any number of grammatical functions or user inputs that are used to meet a specific implementation requirement. The output of 102 is therefore the parameters of the correct output of the system, which establishes the extraction target that needs to be found within the requested input.

The input that contains the text set then may be parsed to locate term units (TUs) 103 as shown in SYSTEMS AND METHODS FOR INDEXING INFORMATION FOR A SEARCH ENGINE", U.S. application Ser. No. 12/192,794, filed 15 Aug. 2008, the disclosure of which is hereby incorporated herein by reference in its entirety, which initially takes the text set and determines the set of TU delimiters that exist for the underlying language or languages of the text set.

The TU delimiter is similar to, but not necessary a word delimiter for a given language. TUs are based on characters that map to a specific set of functions within a language, such as words, symbols, punctuation, etc. For instance, in one embodiment, English uses the space as a delimiter for words, but it is insufficient to determine the entire functional usage of each character within the input, such as a sentence stop like a period or question mark. Therefore, it is recommended that a TU splitter should be used so that the ability to derive the search terms can include symbols and other such characters that have a specific meaning within the language or languages being used in the inputs. In most implementations, the duplicates from the TU list can be removed, unless frequency or other statistical analysis is to be performed at this point.

The optional grammatical function for each TU 104 is established at this time, once the TUs in the document have been found for those extract target determinations that require it. Some implementations may already contain the grammatical function embedded in their data structure, while some other implementations may not have performed grammatical analysis on the input. At this point, this grammatical analysis should be done so that the grammatical function of each TU can be known. Any number of methods for determining the grammatical functions can be used. For instance, an exemplary system may determine the parts-of-speech for each term, and use that value as the grammatical function. Another exemplary system may use a set of functions that describe the role of each TU in the document, such as that found within the application entitled "Natural Language Determiner", filed on 24 Sep. 2012, Ser. No. 13/625,784, which is incorporated herein by reference in its entirety. Regardless of the method, the output of this process comprises a set of terms that meets the grammatical function requirements of 102.

Once the set of TUs are found for the text set that have a specific grammatical function, then the filter process 105 can be used to remove any number of TUs by using the extraction target as the filter. A focus TU may be defined as part of the filter using any kind of criteria that is a distinguishing characteristic that is required for a specific implementation. If there is a criteria that can be expressed as a single TU and can be distinguished from other criteria, then it can be used as a focus TU. The focus TU may be described as a verb, whereby any TU not equal to a verb is filtered out. If a functional descriptor is used, it may be used when it is supported by the underlying data format, such as requiring that only modifiers be used. This is common when sentiment and other such measurements are used since they generally modify an object of interest, such as "this product is good" (good=modifier) or "it is a bad product" (bad=modifier). A less grammatical focus TU can be set, such as a term like "US dollar". In addition, the use of the focus TU is constrained by the underlying system and the amount of grammar analysis that is available to the system at the time of determining the focus object, and may also be constrained by the requirements for a particular request. An implementation may support any number of extraction target(s).

Test 106 determines if there are any TUs remaining after the filter has been run for the text set input. If no TUs remain, get the next text set 107. Otherwise, the optional determination of the target variations 108 that meets the target requirements is performed next if required by an implementation. For instance, if there are similarities that are allowed, such as the use of synonyms, then these similarities can be calculated and established. For instance, if the sample extraction target is equal to the price of a garment, such as "$100", variations may be found by running functions that locate expressions similar to it, such as "one-hundred dollars", "100 dollars", "USD100", and other such terms. This may also be used in a semantical context, such as removing terms that do not represent a semantical meaning, such as "lousy product" and "not a good product" would be considered equivalent to "bad product".

Optionally, the variations that are found to be part of the same entity are grouped into like ranges 109. This is partially dependent on the system implementation, since in some cases each term could be grouped as found to be related. For instance, if a system scans the entire document for a single extraction target, then this would be done as soon as a variation has been found. If there are multiple members of an extraction target, then a system could be implemented whereby the range is built by grouping them on the fly into the appropriate group after the group membership had been established. Alternatively, the system may look for all the members of a specific extraction target that forms the range to be grouped. Regardless of how the grouping has been established, the output of 109 contains all the range of acceptable expressions grouped together.

At this point, the text extraction can return all the terms that meet the target, including all similarities as allowed by the implementation to the calling function or user. However, a test for further extraction expansion can be done 110. If positive, then the system can assign expansion intervals 111. This further expansion refers to the problem when a grammatical function is an object and the use of that object in a sentence might be required to show the originating context that the extraction came from. For some implementations, such as automated search, this is generally not required; for others, such as feeding information about events related to a specific topic, this is usually required. An example of this is feeding devices for specific information that may require further analysis before the extraction is completed. This includes, but is not limited to, topical analysis, location analysis, or other quantification methods; an example of which is shown in the U.S. patent application Ser. No. 13/027,256, filed 14 Feb. 2011, entitled "GRAMMAR TOOLS", the disclosure of which is hereby incorporated herein by reference.

A quantification represents a way of establishing the context for a specific section or sections of a text input. For example, a topic used associate specific terms with a context. A topic represents the main point of the text input, and has a starting and an ending point. In some cases, the start and end point match the length of the text; in most cases, they do not. They can be determined any number of ways; the topic is normally an object (object length is variable) and requires a measurement that determines its importance before it can be used by the system as a topic. Then, the endpoint of the topic needs to be considered. In an exemplary method, the endpoint is found by looking for an extant use of the same start point as an endpoint and extending it to the end of the sentence or paragraph it occurs in. Once the further expansion has been determined, the expansion interval assignment 111 may be equivalent to a sentence or a paragraph as well as a quantification interval that may represent any section of the document to be extracted. For instance, an implementation requires that the text extraction contain the extraction target "Siberian". It may also specify that the topic be used to expand the extraction target. Then, the topic interval for "dog" is used to perform the extraction. In another example, it may be that any object that is related to the topic "dog" is used, causing the entire topical interval to be used, containing any object including "Siberian".

Once the full extent of the extraction has been assigned, then the text extraction is completed and can be returned to the user or calling function 112. This may be in the form of a list of words, as would be required for an automated search function, in a variety of orders, such as grouping based on like ranges so that all the variations within a group are visible to the user or calling function. It may also have an expansion interval and this would return a sentence, paragraph, or multiple paragraphs or sections of a document. An implementation may include an extraction target "Siberian husky" but would like to see the sentences that occurred within the input that contained the extraction target, which is equal to a sentence expansion interval. A sample document might be "There are several different northern breeds. They include many sled-dog breeds related to the Samoyed, including the Alaskan and Siberian Husky. The most popular northern breed in the United States, the Siberian Husky is a striking breed coming in a variety of fur colors and eye colors including a beautiful blue.". The extraction then would include the two sentences: "They include many sled-dog breeds related to the Samoyed, including the Alaskan and Siberian Husky." and "The most popular northern breed in the United States, the Siberian Husky is a striking breed coming in a variety of fur colors and eye colors including a beautiful blue". Note that the returned data may be presented to a user, via a display, or other man-machine interface, or the returned data may be provided to another program application that uses the returned data as input for further processing.

Extracted text has a variety of uses and can be outputted to any number of end user and interfaces that require a segment of a document that is relevant to a specific task. For instance, a marketing organization may use an extraction target that modifies a grammatical function so that includes a specific variable value. The extraction target is equal to the use of the object grammatical function, and the specific variable is any negative sentiment. The system may return the following extraction targets: "bad toothpaste, "poor quality toothpaste", and "inferior mint-flavored toothpaste". They may or may not use, depending on the use of the calling function, an expansion variable, to include the sentences where these occurred. These expansions may be further enhanced by the use of quantification measures, such as time intervals, and the use of the time intervals may be refined by a restriction on time, within the last 3 days. The time would be indicated in the return, and may be grouped together based on the time interval. The expansion may also include location interval information, such as "central city" in the extraction return. An example input is as follows.

Toothpaste Reviews
11/20/13
Reviewer 1: Palm Florida
The toothpaste is good quality and cleans well.
Reviewer 2: Dock Montana
This is a poor-quality toothpaste. It does not remove stains.
Reviewer 3: Ranch Texas
Inferior mint-flavored toothpaste. The mint flavor is obnoxious.
Reviewer 4: Fruit Georgia
This is a bad toothpaste that does not really leave your breath fresh. It also does not remove plaque.

The output of the system would look like this. Output 1="Dock Montana. This is a poor-quality toothpaste". Output 2="Ranch Texas. Inferior mint-flavored toothpaste". Output 3="Fruit Georgia. This is a bad toothpaste that does not really leave your breath fresh.".

Figure 2:
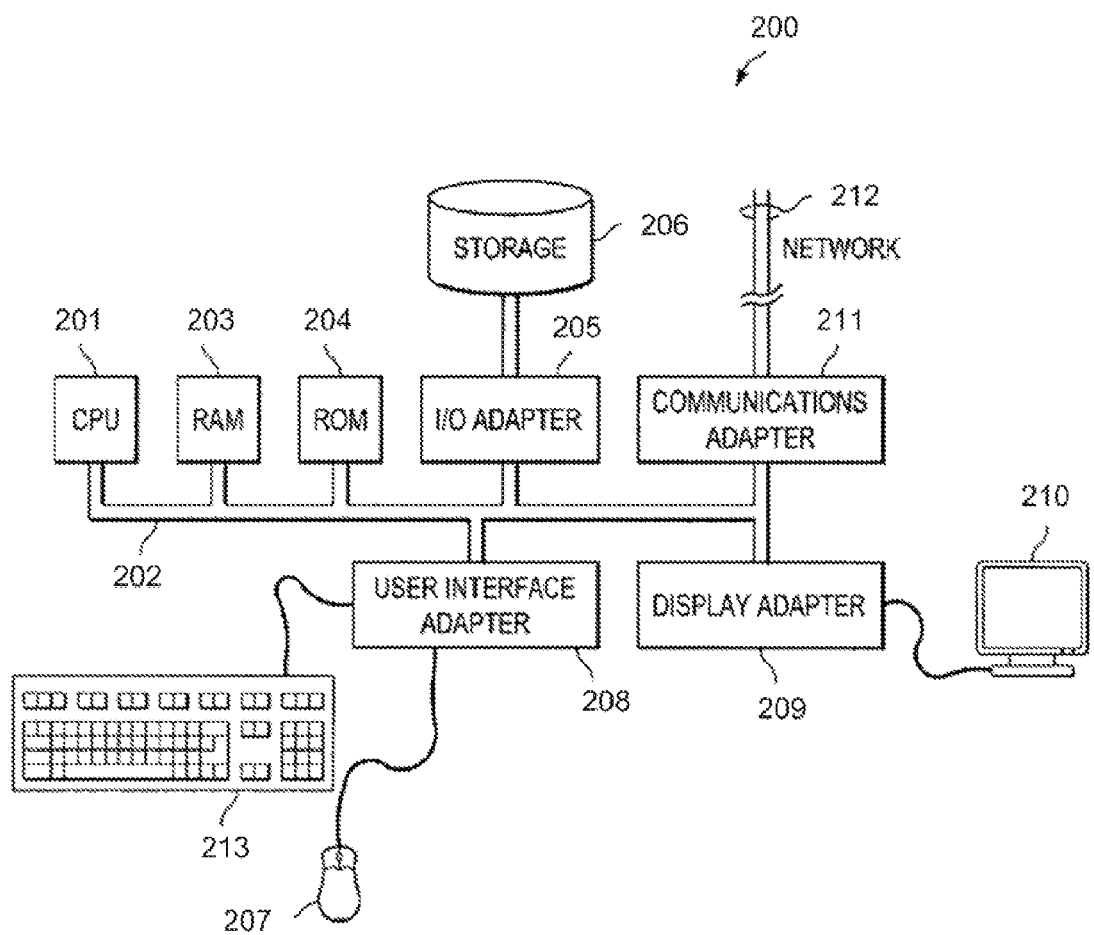
FIG. 2 depicts a block diagram of a computer system which is adapted to use the present invention.

FIG. 2 illustrates computer system 200 adapted to use the present invention. Central processing unit (CPU) 201 is coupled to system bus 202. The CPU 201 may be any general purpose CPU, such as an Intel Pentium processor. However, the present invention is not restricted by the architecture of CPU 201 as long as CPU 201 supports the operations as described herein. Bus 202 is coupled to random access memory (RAM) 203, which may be SRAM, DRAM, or SDRAM. ROM 204 is also coupled to bus 202, which may be PROM, EPROM, or EEPROM. RAM 203 and ROM 204 hold user and system data and programs as is well known in the art.

Bus 202 is also coupled to input/output (I/O) controller 205, communications adapter 211, user interface 208, and display 209. The I/O adapter card 205 connects to storage devices 206, such as one or more of flash memory, a hard drive, a CD drive, a floppy disk drive, a tape drive, to the computer system. Communications 211 is adapted to couple the computer system 200 to a network 212, which may be one or more of a telephone network, a local (LAN) and/or a wide-area (WAN) network, an Ethernet network, and/or the Internet network. User interface 208 couples user input devices, such as keyboard 213, pointing device 207, to the computer system 200. The display card 209 is driven by CPU 201 to control the display on display device 210.

Note that any of the functions described herein may be implemented in hardware, software, and/or firmware, and/or any combination thereof. When implemented in software, the elements of the present invention are essentially the code segments to perform the necessary tasks. The program or code segments can be stored in a processor readable medium. The "processor readable medium" may include any physical medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Embodiments described herein operate on or with any network attached storage (NAS), storage array network (SAN), blade server storage, rack server storage, jukebox storage, cloud, storage mechanism, flash storage, solid-state drive, magnetic disk, read only memory (ROM), random access memory (RAM), or any conceivable computing device including scanners, embedded devices, mobile, desktop, server, etc. Such devices may comprise one or more of: a computer, a laptop computer, a personal computer, a personal data assistant, a camera, a phone, a cell phone, mobile phone, a computer server, a media server, music player, a game box, a smart phone, a data storage device, measuring device, handheld scanner, a scanning device, a barcode reader, a POS device, digital assistant, desk phone, IP phone, solid-state memory device, tablet, and a memory card.

What is claimed is:

1. A computer program product having a non-transitory computer-readable medium, wherein the computer-readable medium has a computer program logic recorded thereon, the computer program logic is operative on an input data set involving grammar, the computer program product comprising:
    code for receiving the input data set, wherein the input data set is received from an originator;
    code for determining a target of the input data set, wherein the target is a variable that is a grammatical function, wherein the grammatical function is an object, wherein a user of the computer program product selects the target;
    code for expanding the target into a range of objects;
    code for parsing the input data set into a plurality of term units (TUs), wherein each TU is one of a word, a symbol, and a punctuation mark, wherein each TU is separated from another TU by a delimiter space;
    code for retrieving a respective grammatical function for each TU;
    code for grouping the TUs according to their respective grammatical function based on the expanded target; and
    code for displaying the grouped TUs to the user via an interface.

2. The computer program product of claim 1, wherein computer program product further comprises:
    code for assigning an expansion interval, if an originating context is needed for one or more of the remaining TUs.

3. The computer program product of claim 1, wherein the computer program product resides on a device selected from a group of devices comprising:
    a computer, a laptop computer, a personal computer, a personal data assistant, a camera, a phone, a cell phone, a mobile phone, a computer server, a media server, a music player, a game box, a smart phone, a data storage device, a measuring device, a handheld scanner, a scanning device, a barcode reader, a POS device, a digital assistant, a desk phone, an IP phone, a solid-state memory device, a tablet, and a memory card.

* * * * *